US008645613B2

(12) United States Patent
Tan

(10) Patent No.: US 8,645,613 B2
(45) Date of Patent: Feb. 4, 2014

(54) DATA WRITING METHOD FOR FLASH MEMORY AND CONTROL CIRCUIT AND STORAGE SYSTEM USING THE SAME

(75) Inventor: Kheng-Chong Tan, Hsinchu County (TW)

(73) Assignee: Phison Electronics Corp., Miaoli (TW)

( * ) Notice: Subject to any disclaimer, the term of this patent is extended or adjusted under 35 U.S.C. 154(b) by 631 days.

(21) Appl. No.: 12/554,347

(22) Filed: Sep. 4, 2009

(65) Prior Publication Data

US 2011/0004723 A1    Jan. 6, 2011

(30) Foreign Application Priority Data

Jul. 3, 2009    (TW) .............................. 98122621 A

(51) Int. Cl.
    *G06F 12/02*    (2006.01)
(52) U.S. Cl.
    USPC .... 711/103; 711/170; 711/209; 711/E12.002; 711/E12.008
(58) Field of Classification Search
    None
    See application file for complete search history.

(56) References Cited

U.S. PATENT DOCUMENTS

2007/0143561 A1 *    6/2007    Gorobets ...................... 711/170

FOREIGN PATENT DOCUMENTS

| TW | 200923762 | 6/2009 |
| TW | 200926183 | 6/2009 |

OTHER PUBLICATIONS

"Office Action of Taiwan Counterpart Application", issued on Oct. 31, 2012, p. 1-p. 14.

* cited by examiner

*Primary Examiner* — Reginald Bragdon
*Assistant Examiner* — Eric Loonan
(74) *Attorney, Agent, or Firm* — J.C. Patents

(57) ABSTRACT

A data writing method for a flash memory and a control circuit and a storage system using the same are provided. The data writing method includes determining whether the size of data to be stored by a host system is smaller than a predetermined value according to a write command received from the host system, when the size of the data is smaller than the predetermined value, the data is written into a corresponding buffer physical block or a corresponding spare buffer physical block. The data writing method further includes combining valid data belonging to the same logical block during the executions of several write commands. Accordingly, the response time during the execution of each write command is shortened, and the problem of timeout is avoided.

13 Claims, 13 Drawing Sheets

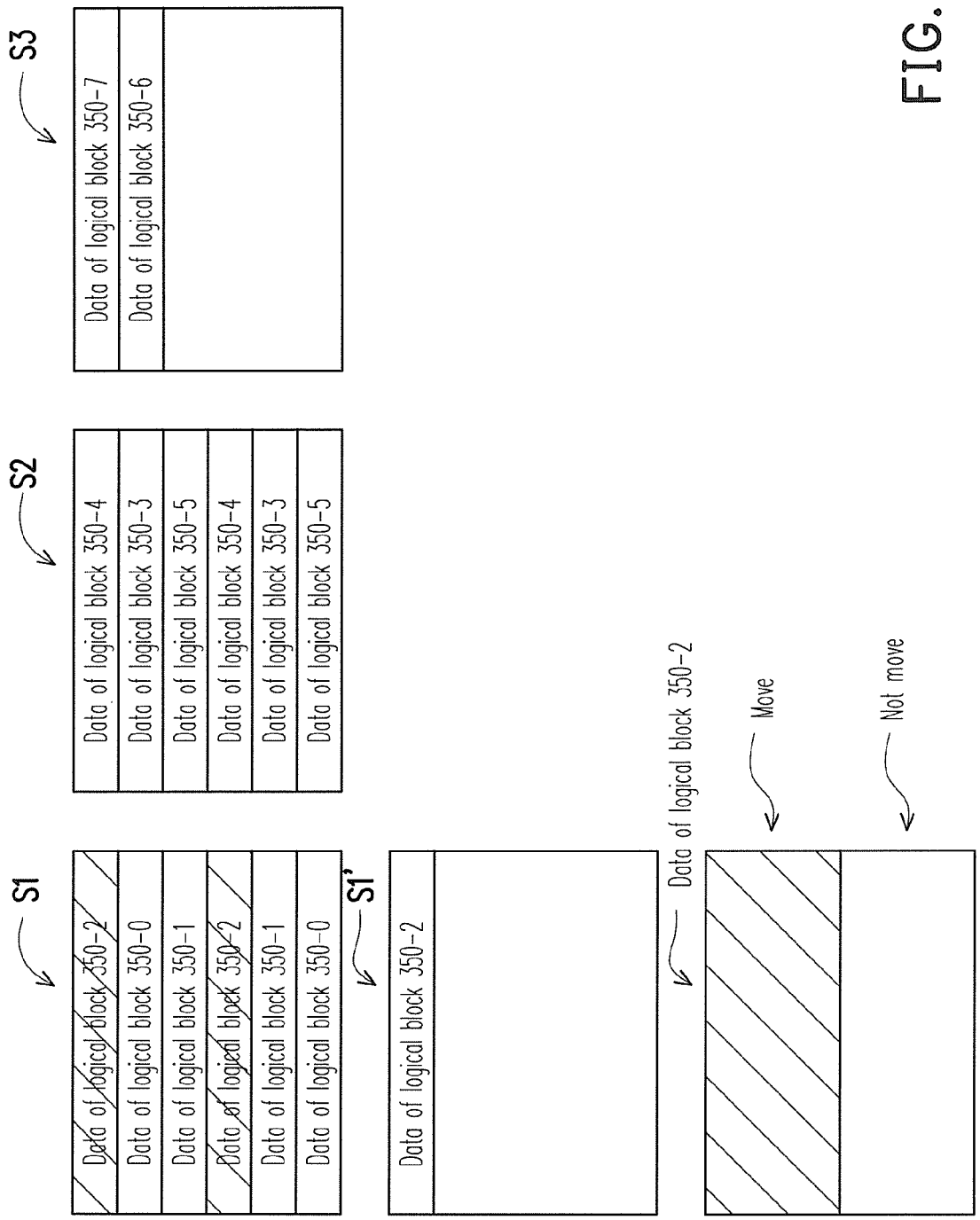

DATA WRITING METHOD FOR FLASH MEMORY AND CONTROL CIRCUIT AND STORAGE SYSTEM USING THE SAME

CROSS-REFERENCE TO RELATED APPLICATION

This application claims the priority benefit of Taiwan application serial no. 98122621, filed on Jul. 3, 2009. The entirety of the above-mentioned patent application is hereby incorporated by reference herein and made a part of specification.

BACKGROUND

1. Technology Field

The present invention generally relates to a data writing method, and more particularly, to a data writing method which can shorten a response time, and a flash memory control circuit and a flash memory storage system using the same.

2. Description of Related Art

Along with the widespread of digital cameras, cell phones, and MP3 in recently years, the consumers' demand to storage media has increased drastically. Flash memory is one of the most adaptable memories for such battery-powered portable products due to its characteristics such as data non-volatility, low power consumption, small volume, and non-mechanical structure. A solid state drive (SSD) is a storage device that uses a NAND flash memory as its storage medium.

Generally speaking, a flash memory module in a flash memory storage device has a plurality of physical blocks, and these physical blocks are logically grouped by a flash memory controller of the flash memory storage device into a system area, a data area, a spare area, and a replacement area. The physical blocks in the system area are used to store important information related to the flash memory storage device, and the physical blocks in the replacement area are used to replace damaged physical blocks in the data area or the spare area. Thus, a host system cannot access the physical blocks in the system area or the replacement area in general access states. The physical blocks in the data area are used to store valid data written by write commands, and the physical blocks in the spare area are used to substitute the physical blocks in the data area when the write commands are executed. To be specific, when a flash memory storage device receives a write command from a host system and accordingly is about to update (or write) data in a physical block in the data area, the flash memory storage device first selects a physical block from the spare area, then writes the old valid data in the physical block to be updated in the data area and the new data into the physical block selected from the spare area, logically links the physical block containing the new data to the data area, and eventually erases the physical block to be updated in the data area and logically links it to the spare area. In order to allow the host system to successfully access the physical blocks that are alternatively used to store data described above, the flash memory storage device provides logical blocks to the host system. Namely, the flash memory storage device reflects the substitution of the physical blocks by recording and updating the mapping relations between the logical blocks and the physical blocks in the data area in a logical address-physical address mapping table. Thus, the host system simply accesses a logical block while the flash memory storage device accesses the corresponding physical block according to the logical address-physical address mapping table.

Thanks to the advancement in the manufacturing process of flash memories and to increase the capacity of storage media, the capacities of each programming unit and each erasing unit have been designed larger and larger. As a result, it takes a longer time to move the valid data in a physical block. However, such a flash memory having a larger erasing unit may become inapplicable to a flash memory storage device (for example, a SD memory card) because the response time of a write command may exceed the specified response time of the flash memory storage device. Accordingly, it is needed to short the response time of each write command executed in a flash memory storage device.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a data writing method, wherein the response time of writing data into a flash memory chip is shortened so that the problem of timeout is avoided.

The present invention is directed to a flash memory control circuit, wherein the response time of writing data into a flash memory chip is shortened so that the problem of timeout is avoided.

The present invention is directed to a flash memory storage system, wherein the response time of writing data into a flash memory is shortened so that the problem of timeout is avoided.

According to an exemplary embodiment of the present invention, a data writing method for writing data from a host system into a flash memory chip is provided, wherein the flash memory chip includes a plurality of physical blocks. The data writing method includes providing a flash memory controller to receive a write command and the data from the host system. The data writing method also includes allocating a plurality of logical blocks, wherein each of the logical blocks is mapped to at least one of the physical blocks, and the host system stores the data into one of the logical blocks. The data writing method further includes grouping the logical blocks into a plurality of logical block groups and selecting some of the physical blocks as a plurality of buffer physical blocks, wherein each of the buffer physical blocks is corresponding to one of the logical block groups. The data writing method still includes determining whether the size of the data from the host system is smaller than a predetermined value and whether the buffer physical block corresponding to the logical block for writing the data is full by using the flash memory controller, wherein when the size of the data from the host system is smaller than the predetermined value and the buffer physical block corresponding to the logical block for writing the data is full, the flash memory controller selects another one of the physical blocks as a spare buffer physical block and writes the data from the host system into the spare buffer physical block, and the spare buffer physical block is corresponding to the buffer physical block that is corresponding to the logical block for writing the data.

According to an exemplary embodiment of the present invention, a flash memory control circuit for writing data from a host system into a flash memory chip is provided, wherein the flash memory chip includes a plurality of physical blocks. The flash memory control circuit includes a microprocessor unit, a flash memory interface unit, a host interface unit, and a memory management unit. The flash memory interface unit is coupled to the microprocessor unit and used to couple to the flash memory chip. The host interface unit is coupled to the microprocessor unit and used to coupled to the host system and receiving a write command and the data from the host system. The memory management unit is coupled to the microprocessor unit, and allocates a plurality of logical blocks, groups the logical blocks into a plurality of logical block groups, and selects some of the physical blocks as a plurality of buffer physical blocks, wherein each of the logical blocks is mapped to at least one of the physical blocks, the host system stores the data into one of the logical blocks, and each of the buffer physical blocks is corresponding to one of the logical block groups. Besides, the memory management unit further determines whether the size of the data from the host system is smaller than a predetermined value and whether the buffer physical block corresponding to the logical block for writing the data is full. When the size of the data from the host system is smaller than the predetermined value and the buffer physical block corresponding to the logical block for writing the data is full, the memory management unit selects another one of the physical blocks as a spare buffer physical block and writes the data from the host system into the spare buffer physical block, wherein the spare buffer physical block is corresponding to the buffer physical block that is corresponding to the logical block for writing the data.

According to an exemplary embodiment of the present invention, a flash memory storage system for storing data from a host system is provided. The flash memory storage system includes a connector, a flash memory chip, and a flash memory controller. The connector is used to couple to the host system and receiving a write command and the data from the host system. The flash memory chip has a plurality of physical blocks. The flash memory controller is coupled to the connector and the flash memory chip, and allocates a plurality of logical blocks, groups the logical blocks into a plurality of logical block groups, and selects some of the physical blocks as a plurality of buffer physical blocks, wherein each of the logical blocks is mapped to at least one of the physical blocks, the host system stores the data into one of the logical blocks, and each of the buffer physical blocks is corresponding to one of the logical block groups. The flash memory controller further determines whether the size of the data from the host system is smaller than a predetermined value and whether the buffer physical block corresponding to the logical block for writing the data is full. When the size of the data from the host system is smaller than the predetermined value and the buffer physical block corresponding to the logical block for writing the data is full, the flash memory controller selects another one of the physical blocks as a spare buffer physical block and writes the data from the host system into the spare buffer physical block, wherein the spare buffer physical block is corresponding to the buffer physical block that is corresponding to the logical block for writing the data.

In the present invention, a data having its size smaller than a predetermined value is temporarily stored in a buffer physical block, and the valid data of a physical block is moved in several times, so that the time for executing a write command is shortened and the problem of timeout is avoided.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 2A, 2B, 2C-1, 2C-2 and 2C-3 illustrate the operations of a flash memory chip according to an exemplary embodiment of the present invention.

FIGS. 4A~4B illustrate an example of that a flash memory storage system has sufficient resources to allow each logical block group to open a set of mother-child blocks.

DESCRIPTION OF THE EMBODIMENTS

Figure 1:
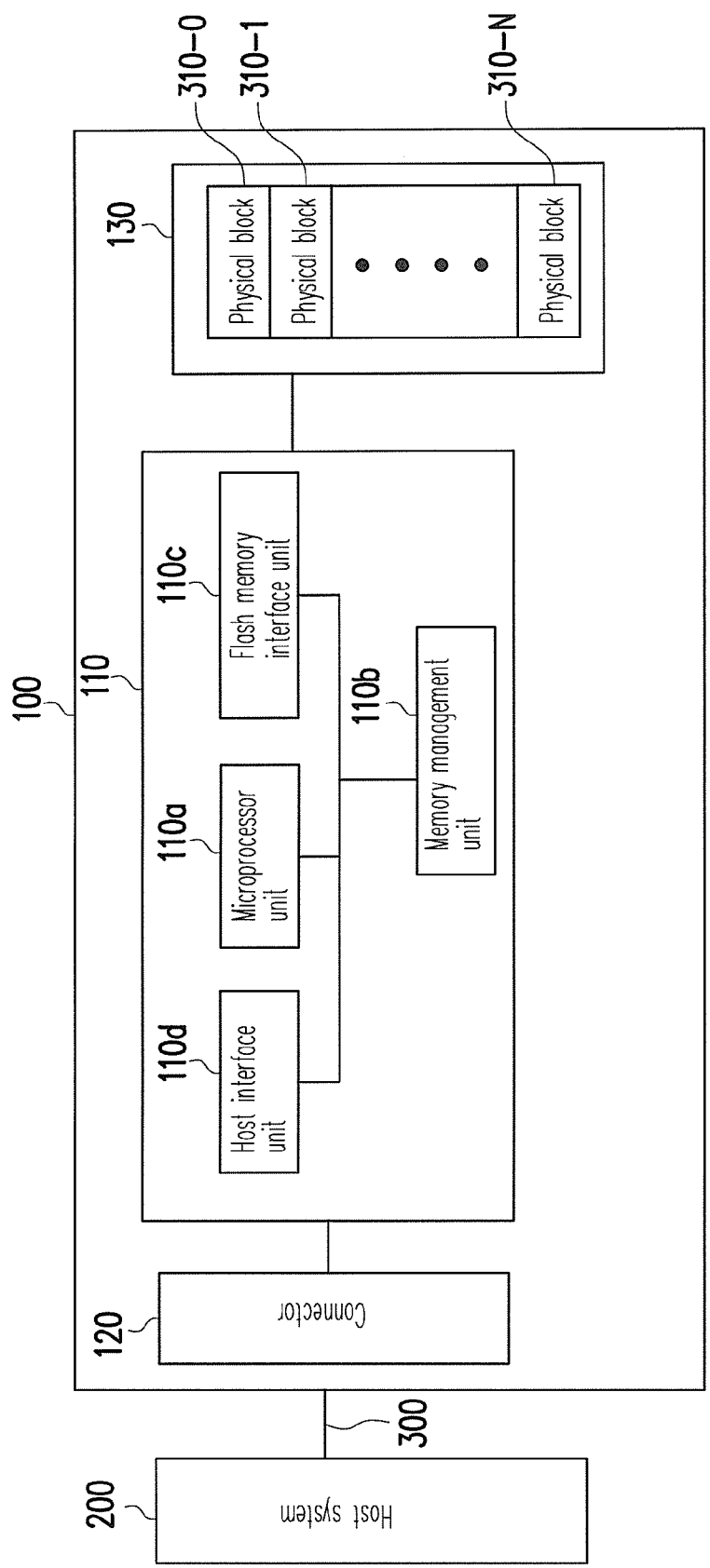
FIG. 1 is a schematic block diagram of a flash memory storage system according to an exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

FIG. 1 is a schematic block diagram of a flash memory storage system according to an exemplary embodiment of the present invention.

Referring to FIG. 1, the flash memory storage device 100 usually works together with a host system 200 so that the host system 200 can write data into or read data from the flash memory storage device 100. In the present exemplary embodiment, the flash memory storage device 100 is a memory card. However, in another exemplary embodiment of the present invention, the flash memory storage device 100 may also be a solid state drive (SSD) or a flash drive.

The flash memory storage device 100 includes a flash memory controller (also referred to as a flash memory control circuit) 110, a connector 120, and a flash memory chip 130.

The flash memory controller 110 executes a plurality of logic gates or control commands implemented in a hardware or firmware form and performs various data operations to the flash memory chip 130 according to commands of the host system 200. The flash memory controller 110 includes a microprocessor unit 110a, a memory management unit 110b, a flash memory interface unit 110c, and a host interface unit 110d.

The microprocessor unit 110a cooperates with the memory management unit 110b, the flash memory interface unit 110c, and the host interface unit 110d to carry our various operations of the flash memory storage device 100.

The memory management unit 110b is coupled to the microprocessor unit 110a and executes a block management mechanism and a data writing mechanism according to the present exemplary embodiment.

In the present exemplary embodiment, the memory management unit 110b is implemented in the flash memory controller 110 as a firmware. For example, the memory management unit 110b including a plurality of control commands is burned into a program memory (for example, a read only memory (ROM)), and the program memory is embedded into the flash memory controller 110. When the flash memory storage device 100 is in operation, the control commands of the memory management unit 110b are executed by the microprocessor unit 110a to accomplish the block management mechanism and the data writing mechanism according to embodiments of the present invention.

In another embodiment of the present invention, the control commands of the memory management unit 110b may also be stored in a specific area of the flash memory chip 130 (for example, a system area in a flash memory for exclusively storing system data) as program codes. Similarly, the control commands of the memory management unit 110b are executed by the microprocessor unit 110a when the flash memory storage device 100 is in operation. In yet another embodiment of the present invention, the memory management unit 110b may also be implemented in the flash memory controller 110 in a hardware form.

The flash memory interface unit 110c is coupled to the microprocessor unit 110a and used to access the flash memory chip 130. Namely, data to be written into the flash memory chip 130 is converted by the flash memory interface unit 110c into a format acceptable to the flash memory chip 130.

The host interface unit 110d is coupled to the microprocessor unit 110a and used to receive and identify commands received from the host system 200. Namely, commands and data received from the host system 200 are transmitted to the microprocessor unit 110a through the host interface unit 110d. In the present exemplary embodiment, the host interface unit 110d is a secure digital (SD) interface. However, the present invention is not limited thereto, and the host interface unit 110d may also be a serial advanced technology attachment (SATA) interface, a universal serial bus (USB) interface, an Institute of Electrical and Electronic Engineers (IEEE) 1394 interface, a peripheral component interconnect (PCI) express interface, a memory stick (MS) interface, a multi media card (MMC) interface, a compact flash (CF) interface, an integrated device electronics (IDE) interface, or other suitable data transmission interfaces.

In addition, even though not shown in the present exemplary embodiment, the flash memory controller 110 may further include other general function modules for controlling the flash memory, such as an error correcting unit and a power management unit.

The connector 120 is coupled to the flash memory controller 110 and used to couple to the host system 200 through a bus 300. In the present exemplary embodiment, the connector 120 is a SD connector. However, the present invention is not limited thereto, and the connector 120 may also be a SATA connector, a USB connector, an IEEE 1394 connector, a PCI express connector, a MS connector, a MMC connector, a CF connector, an IDE connector, or other suitable connectors.

The flash memory chip 130 is coupled to the flash memory controller 110 and used to store data. In the present exemplary embodiment, the flash memory chip 130 is a multi level cell (MLC) NAND flash memory. However, the present invention is not limited thereto, and in another embodiment of the present invention, the flash memory chip 130 may also be a single level cell (SLC) NAND flash memory.

The flash memory chip 130 has physical blocks 310-(0)~310-(N), wherein each of the physical blocks is the smallest erasing unit. Namely, each of the physical blocks has the least number of memory cells that are erased together. Each physical block is usually divided into a plurality of pages. Since the flash memory chip 130 in the present exemplary embodiment is a MLC NAND flash memory, each page is the smallest programming unit. In other words, each page is the smallest unit for reading or writing data. Each page usually includes a data area and a redundant area. The data area is used to store user data, and the redundant area is used to store system data (for example, an error checking and correcting (ECC) Code). In the present exemplary embodiment, each page in the flash memory chip 130 has a capacity of 16 sectors. Generally speaking, each sector has 512 bytes, and accordingly, each page has 8 KB.

It should be noted that in some other flash memory designs (for example, a SLC NAND flash memory), the smallest programming unit may also be a sector. Namely, each sector is served as the smallest programming unit. In addition, the physical blocks 310-(0)~310-(N) may be grouped into several zones. By managing the physical blocks 310-(0)~310-(N) in unit of zones, the execution parallelism of operations is increased and the management of these physical blocks is simplified.

FIGS. 2A, 2B, 2C-1, 2C-2 and 2C-3 illustrate the operations of a flash memory chip according to an exemplary embodiment of the present invention.

It should be understood that the terms like "select", "move", "replace", "substitute", "alternate", and "group" used for describing the operations performed to the physical blocks in the flash memory chip 130 only refer to logical operations. In other words, the actual positions of these physical blocks in the flash memory chip 130 are not really changed. Instead, these physical blocks are only logically operated. It should be mentioned that the operations described below are carried out by the memory management unit 110b of the flash memory controller 110.

Figure 2A:
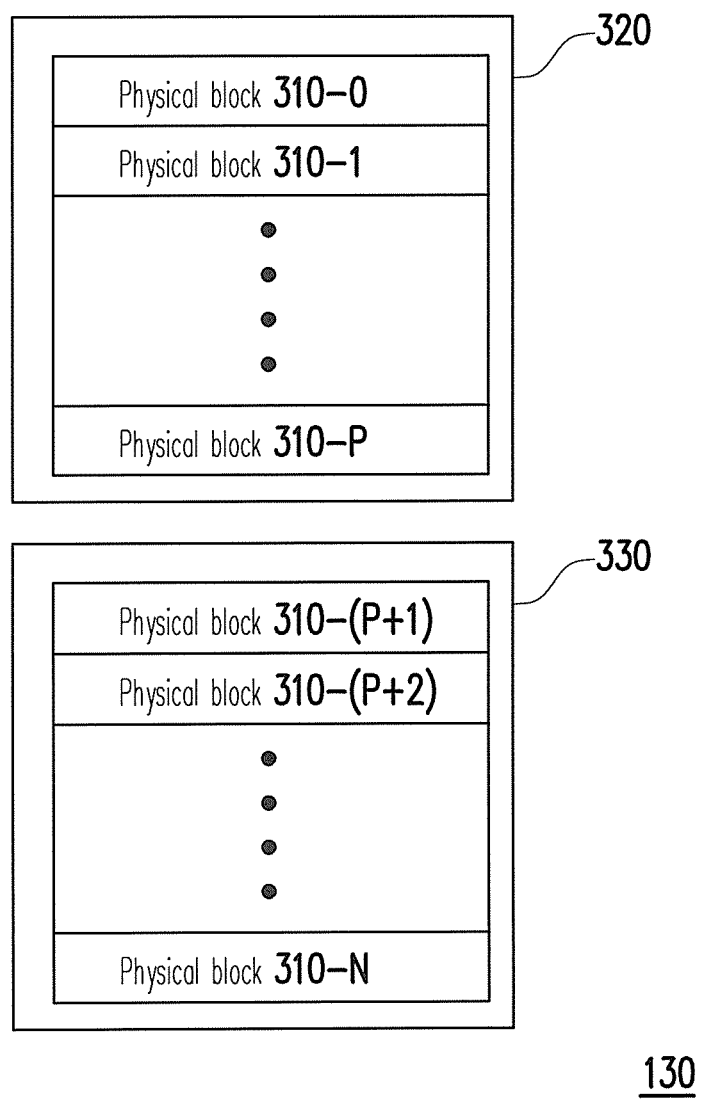

Referring to FIG. 2A, the memory management unit 110b logically groups the physical blocks 310-(0)~310-(N) in the flash memory chip 130 into a storage area 320 and a replacement area 330.

The physical blocks 310-(0)~310-(P) in the storage area 320 are those physical blocks in the flash memory storage device 100 that are normally used. Namely, the memory management unit 110b writes data into the physical blocks in the storage area 320.

The physical blocks 310-(P+1)~310-(N) in the replacement area 330 are physical blocks used for replacement. When the flash memory chip 130 is just manufactured, 4% of its physical blocks may be reserved for replacement purpose. Namely, when a physical block in the storage area 320 is damaged, a physical block in the replacement area 330 can be used for replacing the damaged physical block (i.e., a bad block). Accordingly, if there are still available physical blocks in the replacement area 330 and a physical block is damaged, the memory management unit 110b selects an available physical block from the replacement area 330 for replacing the damaged physical block. If there is no more available physical block in the replacement area 330 and a physical block is damaged, the flash memory storage device 100 is announced as write protected and cannot be used for writing data anymore.

Figure 2B:
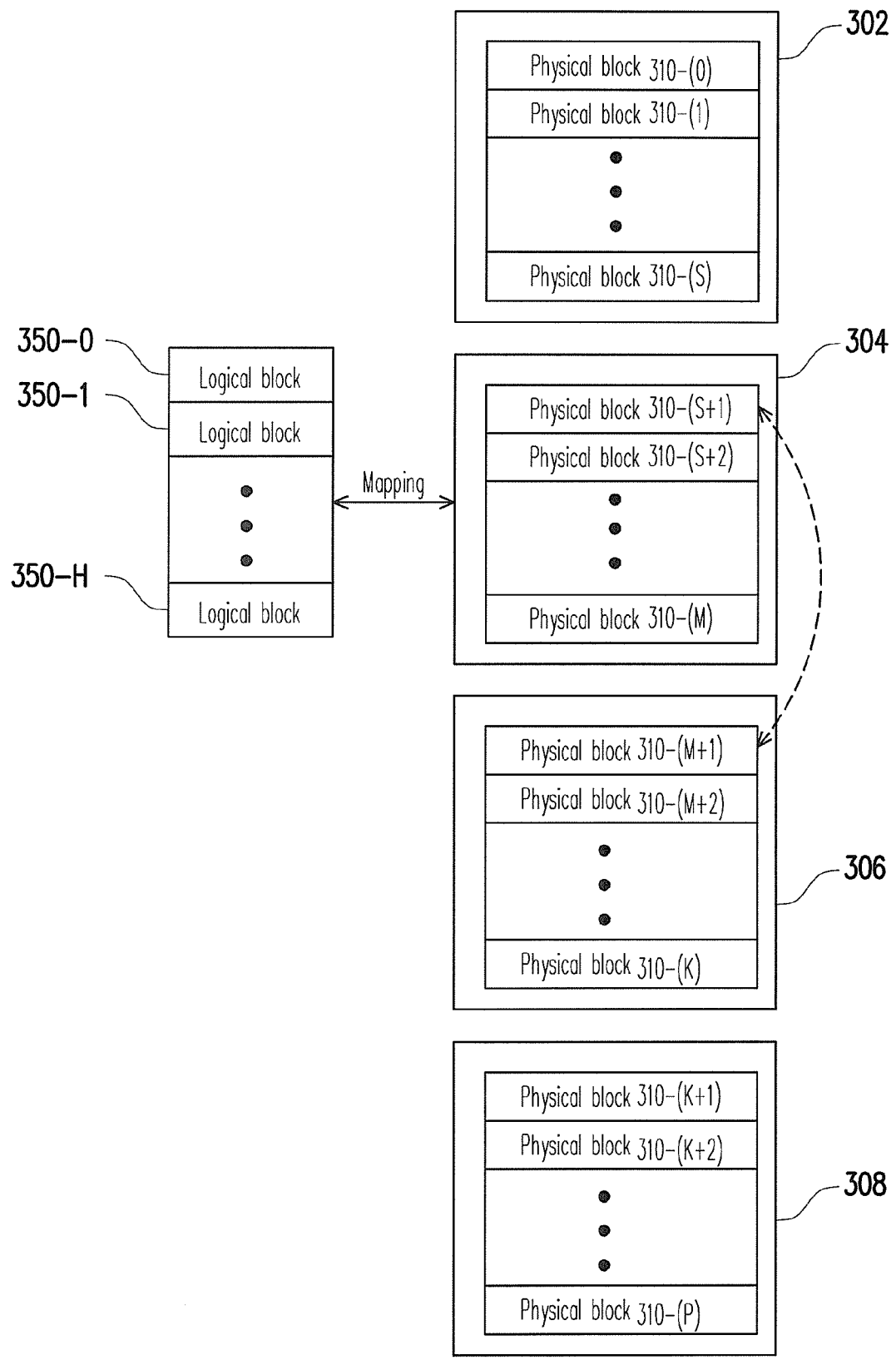

Referring to FIG. 2B, the memory management unit 110b logically groups the physical blocks in the storage area 320 into a system area 302, a data area 304, a spare area 306, and a special area 308.

The system area 302 includes the physical blocks 310-(0)~310-(S), the data area 304 includes the physical blocks 310-(S+1)~310-(M), the spare area 306 includes the physical blocks 310-(M+1)~310-(K), and the special area 308 includes the physical blocks 310-(K+1)~310-(P). In the present exemplary embodiment, S, M, K, and P are positive integers respectively representing the number of physical blocks in each of foregoing areas, and the values thereof can be determined according to the capacity of the flash memory chip by the manufacturer of the flash memory storage system.

The physical blocks logically belonging to the system area 302 are used to store system data, wherein the system data includes the manufacturer and model of the flash memory chip, the number of zones in the flash memory chip, the number of physical blocks in each zone, and the number of pages in each physical block, etc.

The physical blocks logically belonging to the data area 304 are used to store user data, and these physical blocks are usually the physical blocks mapped to the logical blocks that are accessed by the host system 200. Namely, the physical blocks in the data area 304 are used to store valid data.

The physical blocks logically belonging to the spare area 306 are used to substitute the physical blocks in the data area 304. Thus, the physical blocks in the spare area 306 are either blank or available blocks (i.e., no data is recorded therein or data recorded therein is marked as invalid data). Namely, the physical blocks in the data area 304 and the spare area 306 are alternatively used to store data from the host system 200.

As described above, the physical blocks in the flash memory chip 130 are alternatively provided to the host system 200 for storing data. Accordingly, the memory management unit 110b provides logical blocks 350-0~350-H to the host system 200 for accessing data and records the mapping relations between the physical blocks and these logical blocks in a logical address-physical address mapping table.

Figures 1, 2C:
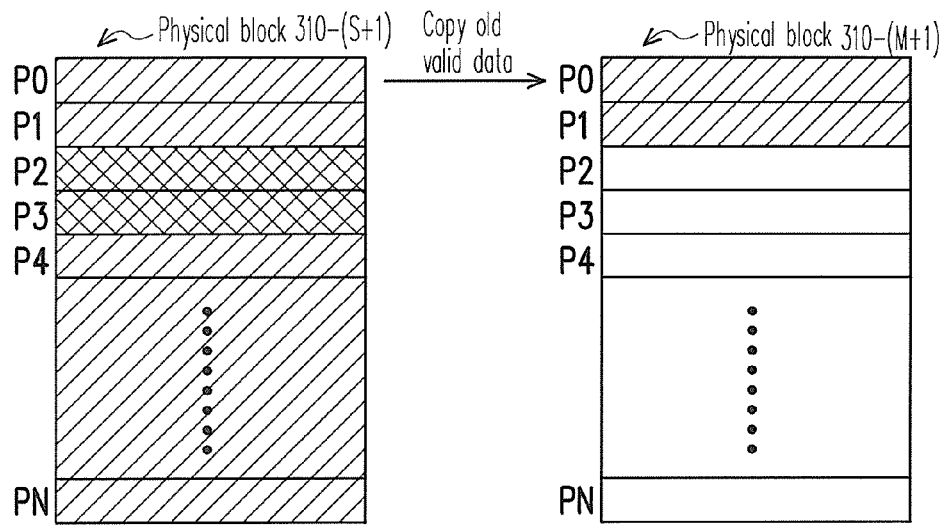
Figures 2, 2C:
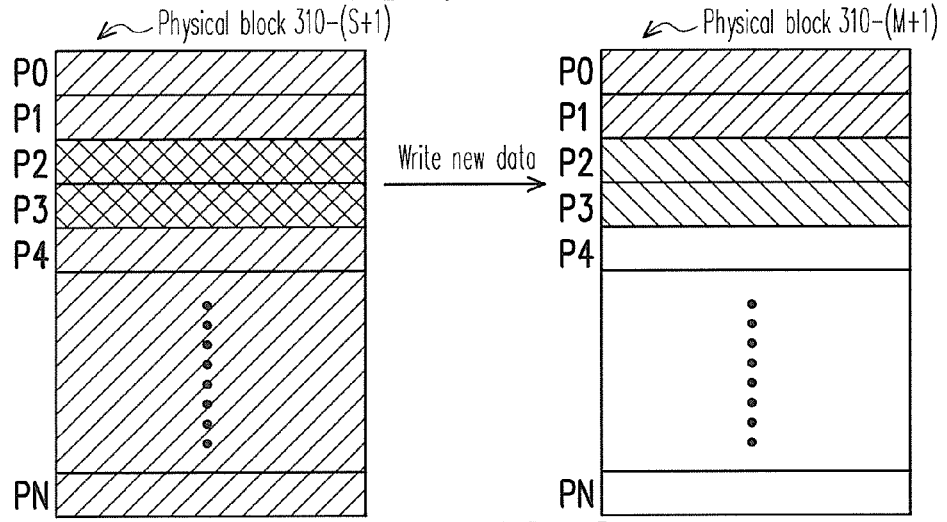

Referring to both FIG. 2B and FIGS. 2C-1, 2C-2 and 2C-3, for example, when the host system 200 is about to store data into the logical block 350-0, the memory management unit 110b gets to know that the logical block 350-0 is currently mapped to the physical block 310-(S+1) logically belonging to the data area 304 according to the logical address-physical address mapping table. Thus, the memory management unit 110b updates the data in the physical block 310-(S+1), and meanwhile, the flash memory controller 110 selects a physical block 310-(M+1) from the spare area 306 as a substitute physical block for substituting the physical block 310-(S+1) in the data area 304. However, when the memory management unit 110b writes the new data into the physical block 310-(M+1), it does not move all the valid data of the physical block 310-(S+1) instantly to the physical block 310-(M+1) to erase the physical block 310-(S+1). To be specific, the memory management unit 110b copies the valid data of the physical block 310-(S+1) to the physical block 310-(M+1) before the page for writing the new data (i.e., the pages P0 and P1) (as shown in FIG. 2C-1) and writes the new data (i.e., the pages P2 and P3 in the physical block 310-(M+1)) into the physical block 310-(M+1) (as shown in FIG. 2C-2). By now, the memory management unit 110b completes the writing operation. Because the valid data of the physical block 310-(S+1) may become invalid during a next operation (for example, a write command), instantly moving all the valid data of the physical block 310-(S+1) to the substitute physical block 310-(M+1) may become meaningless. In the present example, the integrated content of the physical block 310-(S+1) and the physical block 310-(M+1) is the content of the corresponding logical block 350-1. Such the number of mother-child blocks (i.e., the physical blocks 310-(S+1) and 310-(M+1)) can be determined according to the capacity of a buffer memory (not shown) in the flash memory controller 110, and the operation of maintaining such a temporary relationship is referred to as opening mother-child blocks. In particular, when the mother-child blocks for a logical block are open, the logical block which is being processed is mapped to a plurality of physical blocks.

Figures 2, 2C, 3:
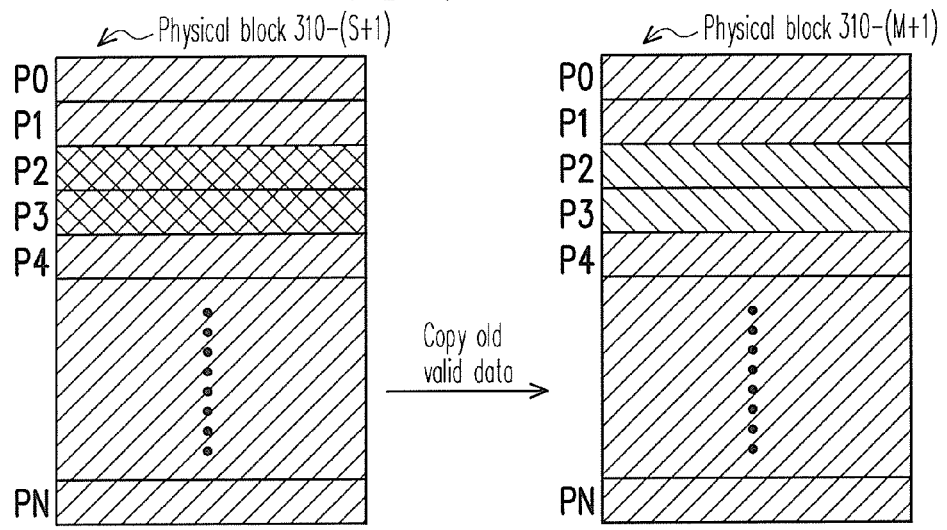

Subsequently, the memory management unit 110b integrates the physical block 310-(S+1) and the physical block 310-(M+1) into a single physical block only when the contents of the two are to be actually combined, so that the efficiency of using physical blocks can be improved. The operation of integrating the physical blocks is also referred to as closing mother-child blocks. For example, as shown in FIG. 2C-3, while closing the mother-child blocks, the memory management unit 110b copies the remaining valid data (i.e., the pages P4~PN) of the physical block 310-(S+1) to the substitute physical block 310-(M+1). After that, the memory management unit 110b erases the physical block 310-(S+1) and links it to the spare area 306. Meanwhile, the memory management unit 110b links the physical block 310-(M+1) to the data area 304 and updates the logical address-physical address mapping table to map the logical block 350-0 to the physical block 310-(M+1). By now, the operation of closing the mother-child blocks is completed. In particular, after the mother-child blocks are closed, the logical block which is processed is mapped to one physical block.

Referring to FIG. 2B again, the physical blocks logically belonging to the special area 308 are used for temporarily storing data to be written by the host system 200 into the flash memory chip 130. As described above, since in the present embodiment, each page in the physical blocks of the flash memory chip 130 has a large storage capacity (as mentioned above, 8 KB), it takes a long time for moving the valid data of the physical block 310-(S+1) to the physical block 310-(M+1). As a result, the response time of the write command may exceed a specified value according to the specification of the flash memory storage device 100. Namely, a timeout problem may occur. It should be mentioned that the memory management unit 110b only temporarily stores data having its size smaller than a predetermined value into the special area 308.

To be specific, taking a physical block having 128 pages in a 2-level cell NAND flash memory as an example, while closing a mother-child block, the time for writing data is about 200 milliseconds, the time for reading data is about 10 milliseconds, and the time for transmitting data is 140 milliseconds. Thus, the time consumed for closing a mother-child block is about 350 milliseconds. In addition, since the host system allows the response time for writing data of one sector to be 250 milliseconds, a write command can be completed within a system specified time if the size of the data to be written exceeds 2 sectors. Moreover, in the present exemplary embodiment, a response time of one sector is further reserved in order to ensure the stability of the system. Thus, in the example of the physical block having 128 pages in a 2-level cell NAND flash memory, the predetermined value is set to 3 sectors. Similarly, taking a physical block having 192 pages in a 3-level cell NAND flash memory as an example, the time required for closing a mother-child block is about 600 milliseconds, and accordingly, the predetermined value is set to 5 sectors.

As described above, in the present exemplary embodiment, only the data having its size smaller than the predetermined value is temporarily stored into a physical block in the special area 308, so as to shorten the response time and avoid the timeout problem.

In the present exemplary embodiment, the memory management unit 110b groups the logical blocks 350-0~350-H into a plurality of logical block groups and respectively designates the physical blocks 310-(K+1)~310-(P) in the special area 308 to the logical block groups as corresponding buffer physical blocks. Besides, when the size of data to be stored by the host system 200 is smaller than the predetermined value, the memory management unit 110b temporarily stores the data into the corresponding buffer physical block according to the logical block group corresponding to the logical block for storing the data.

FIGS. 3A~3D illustrate an example of temporarily storing data into a buffer physical block according to an exemplary embodiment of the present invention. For example, assuming that the memory management unit 110b allocates 9 logical blocks (i.e., the logical blocks 350-0~350-8) and these logical blocks 350-0~350-8 are grouped into a first logical block group including the logical blocks 350-0~350-2, a second logical block group including the logical blocks 350-3~350-5, and a third logical block group including the logical blocks 350-6~350-8, the memory management unit 110b allocates 3 physical blocks (the physical blocks 310-(K+1)~310-(K+3)) in the special area 308, wherein the physical block 310-(K+1) is served as a buffer physical block S1 of the first logical block group, the physical block 310-(K+2) is served as a buffer physical block S2 of the second logical block group, and the physical block 310-(K+3) is served as a buffer physical block S3 of the third logical block group. The present example is described by assuming each physical block has 6 pages. However, the present invention is not limited thereto, and each physical block may also have fewer or more pages. For example, each physical block has 192 pages.

Figure 3A:
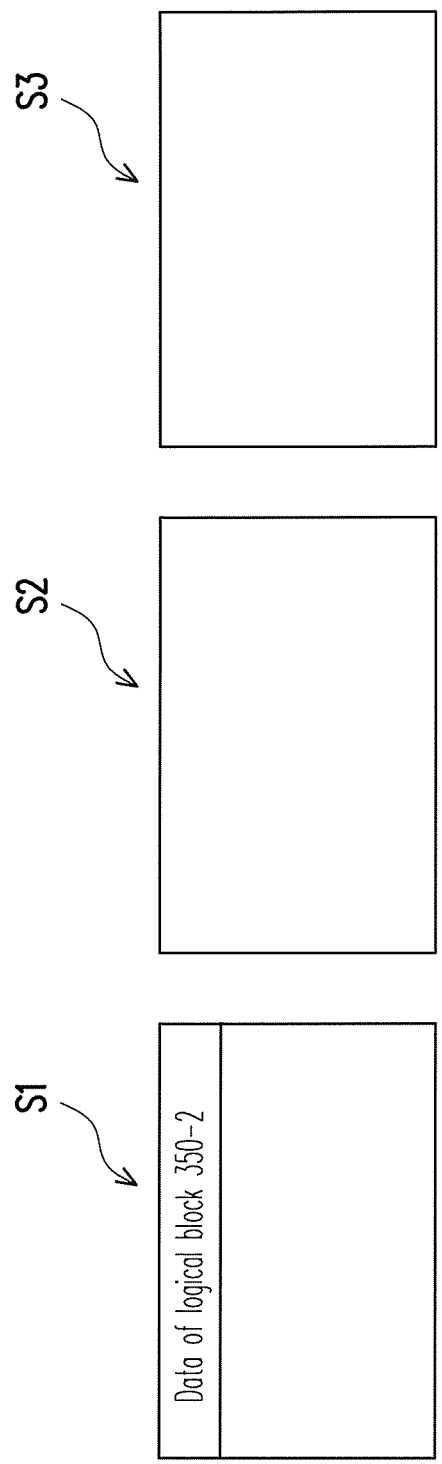
FIGS. 3A~3D illustrate an example of temporarily storing a data into a buffer physical block according to an exemplary embodiment of the present invention.

When the host system 200 is about to store data into the flash memory storage device 100, the host interface unit 110d receives a write command and the data from the host system 200, wherein the write command contains a logical address for storing the data. Then, the memory management unit 110b converts the logical address into a corresponding logical block and determines whether the size of the data is smaller than a predetermined value. When the size of the data is not smaller than the predetermined value, the memory management unit 110b writes the data into a corresponding physical block according to the converted logical block (as shown in FIGS. 2B, 2C-1, 2C-2 and 2C-3). When the size of the data is smaller than the predetermined value, the memory management unit 110b temporarily stores the data into a corresponding buffer physical block according to the converted logical block. For example, as shown in FIG. 3A, when the host system 200 is about to store data having its size smaller than the predetermined value into the logical block 350-2, the memory management unit 110b temporarily stores the data into the buffer physical block S1.

In addition, when the buffer physical block is already full, the memory management unit 110b selects a physical block from the spare area 306 as a corresponding spare buffer physical block, so that the memory management unit 110b can temporarily store the data into the corresponding spare buffer physical block when the buffer physical block has no more available storage space. For example, as shown in FIG. 3B, when the host system 200 is about to store data having a size smaller than the predetermined value into the logical block 350-2 and the buffer physical block S1 is full, the memory management unit 110b selects a physical block (for example, the physical block 310-(M+2)) from the spare area 306 as a spare buffer physical block S1' of the buffer physical block S1 and temporarily stores the data into this spare buffer physical block S1'.

In a case where a specific buffer physical block is full, when the memory management unit 110b temporarily stores data into a spare buffer physical block corresponding to the full buffer physical block according to a write command of the host system 200, the memory management unit 110b further performs a logical block combination process, wherein the memory management unit 110b only combines half of the data in the logical block every time when it executes a write command, so as to avoid the timeout problem. To be specific, the memory management unit 110b selects one of the logical blocks corresponding to the data temporarily stored in the full buffer physical block as a combination target. The memory management unit 110b also selects a physical block from the spare area 306 as a substitute physical block and moves half of the data in the selected logical block to the selected substitute physical block. It should be mentioned that in the present exemplary embodiment, even though the memory management unit 110b moves half of the data in the selected logical block to the selected substitute physical block, the present invention is not limited thereto. To be specific, the quantity of data to be moved is determined according to the capacity of each physical block and the number of logical blocks in each logical block group. For example, if each physical block has I pages and each logical block group has J logical blocks, the quantity of data to be moved is J/I of the data in the selected logical block, wherein J is smaller than or equal to I/2.

Figure 3B:
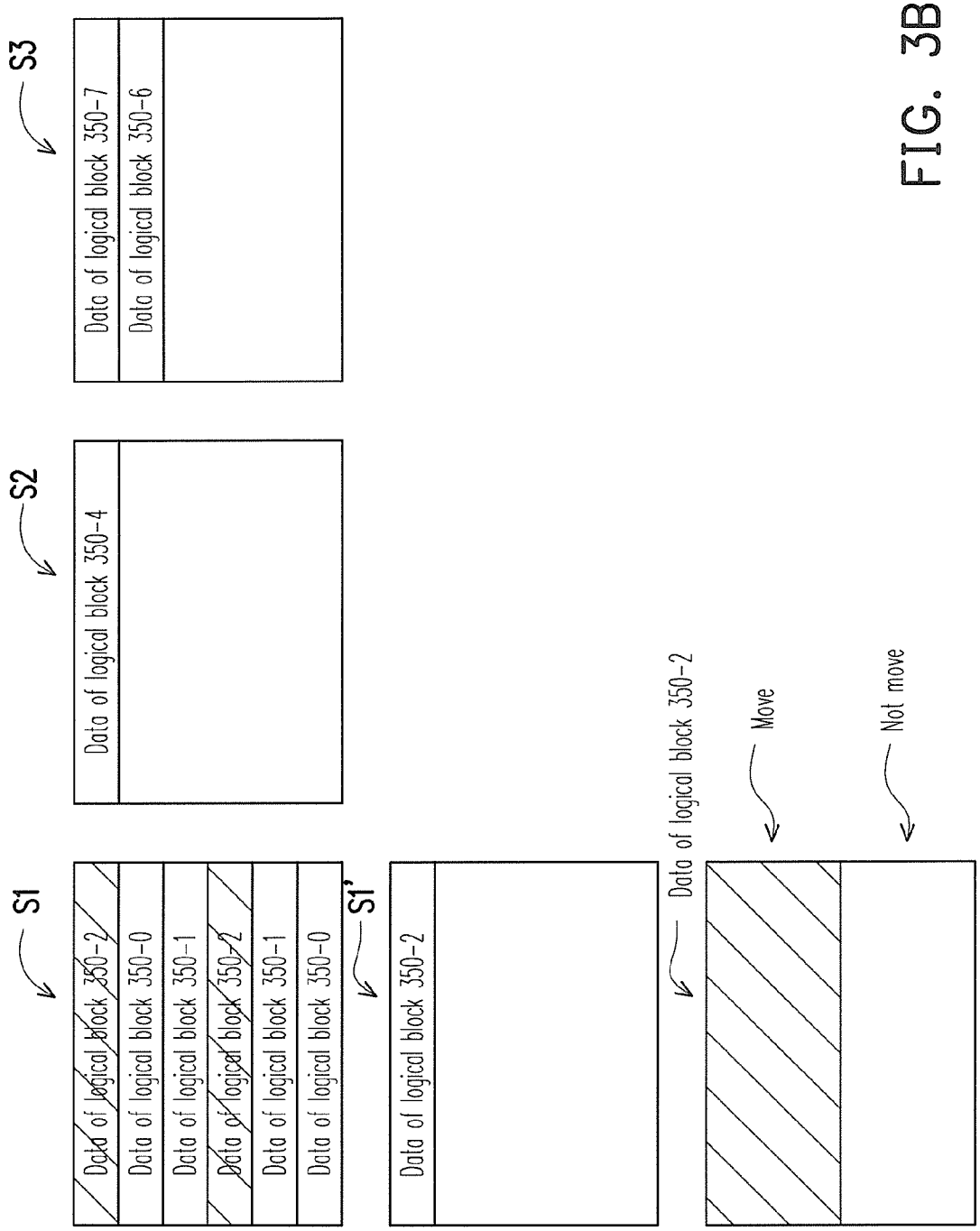
Figure 3C:
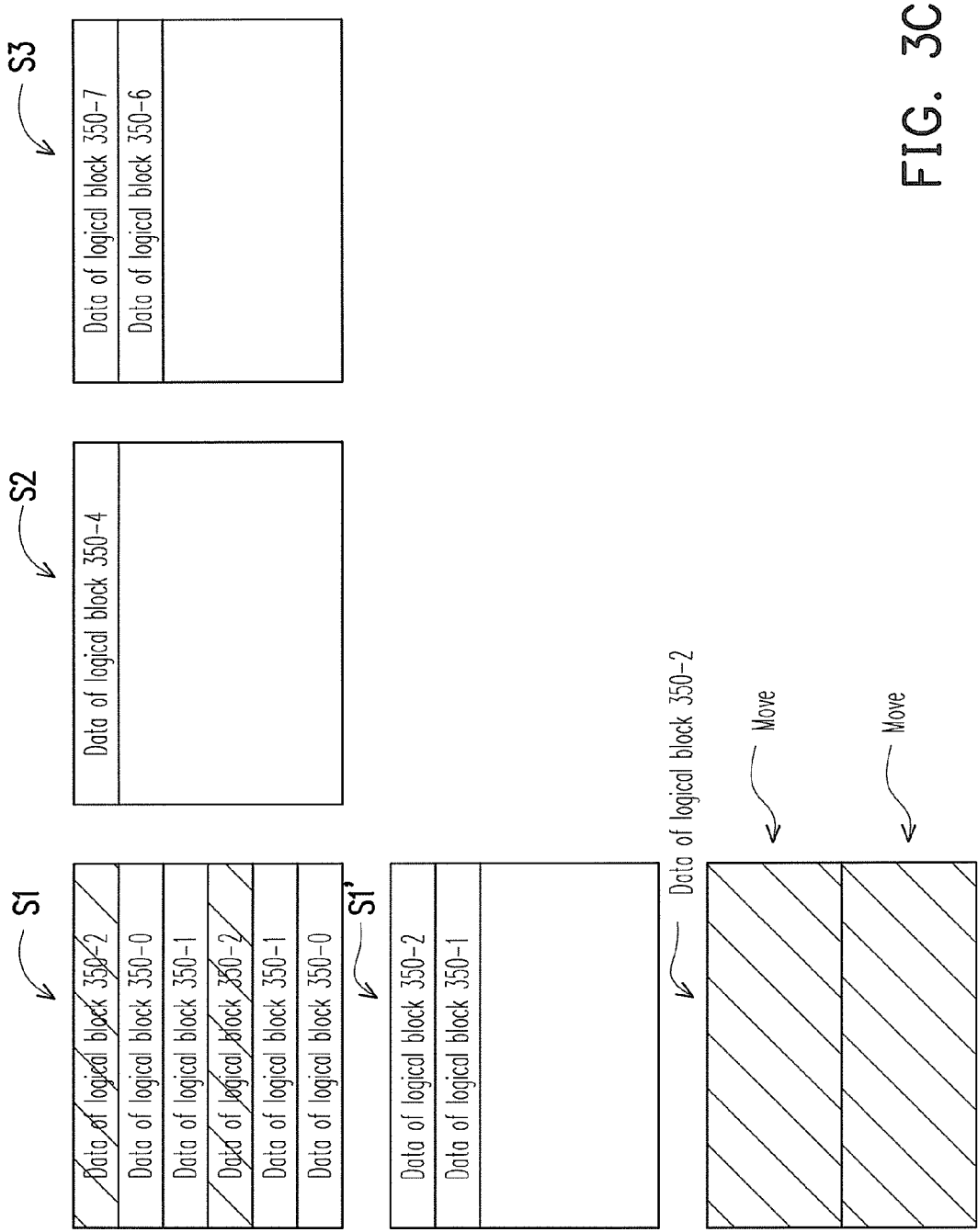

For example, as shown in FIG. 3B, after the memory management unit 110b temporarily stores the data of the logical block 350-2 into the spare buffer physical block S1', it selects the logical block (i.e., the logical block 350-2) corresponding to a first data temporarily stored in the buffer physical block S1 as the combination target. Then, the memory management unit 110b selects a physical block (for example, the physical block 310-(M+3)) from the spare area 306 as a substitute physical block and moves the old valid data of the physical block mapped to the logical block 350-2 and the data of the buffer physical block S1 that belongs to the logical block 350-2 to the physical block 310-(M+3) according to a logical address-physical address mapping table, wherein the memory management unit 110b only moves the first half of the data belonging to the logical block 350-2. Thereafter, as shown in FIG. 3C, after the memory management unit 110b temporarily stores the data belonging to the logical block 350-1 into the spare buffer physical block S1' according to another write command of the host system 200, the memory management unit 110b moves the second half of the data belonging to the logical block 350-2 to complete the combination of the logical block 350-2.

Figure 3D:
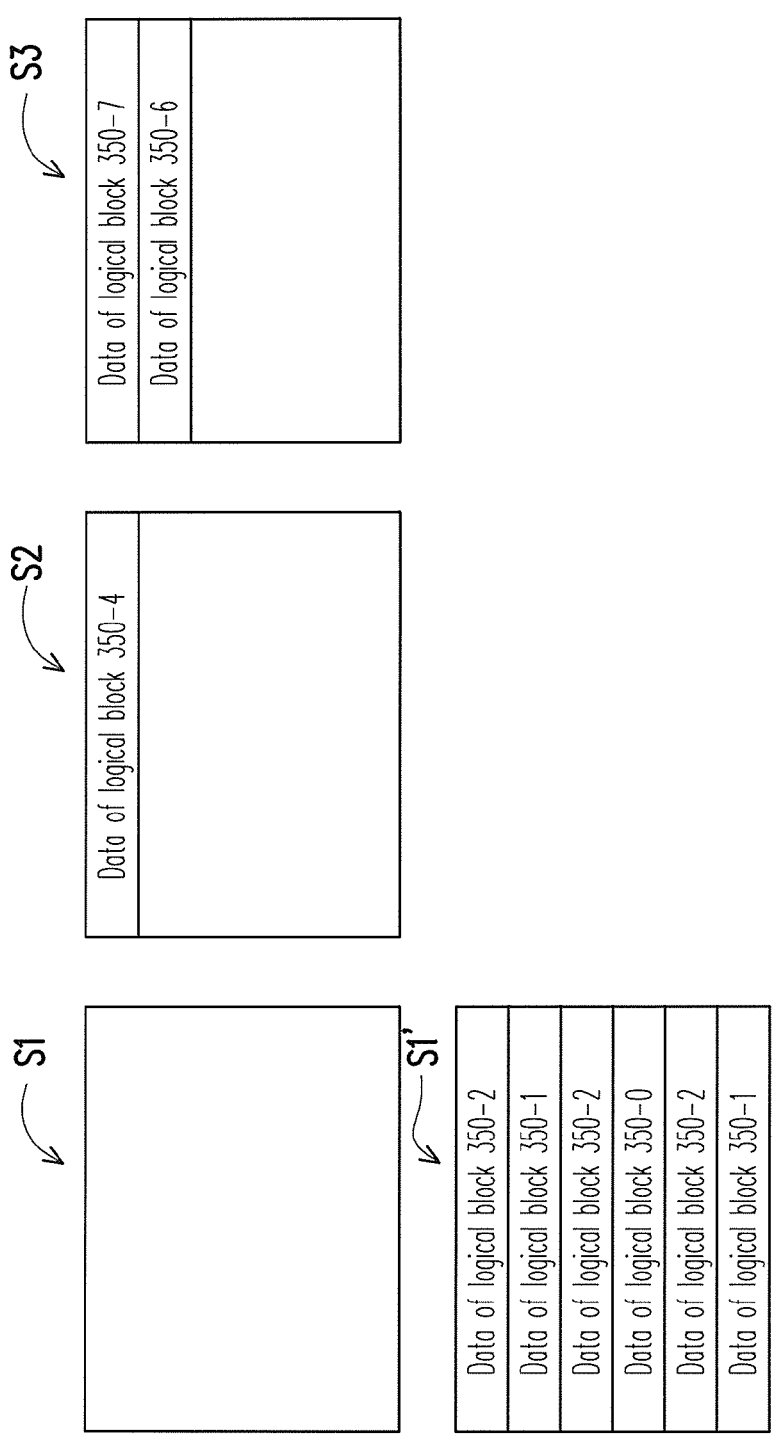

In the present exemplary embodiment, when there is no more unmoved data in a full buffer physical block, the memory management unit 110b executes an erase command to the buffer physical block so that the erased buffer physical block can be used for temporarily storing data again. For example, as shown in FIG. 3D, if subsequently the memory management unit 110b temporarily stores a plurality pieces of data having their sizes smaller than the predetermined value into the spare buffer physical block S1' and combines a plurality of logical blocks to move all the data of the buffer physical block S1 to the corresponding physical blocks, the memory management unit 110b erases the data stored in the buffer physical block S1. After that, when the spare buffer physical block S1' is full, the memory management unit 110b temporarily stores data into the buffer physical block S1 and combines the logical blocks corresponding to the data in the spare buffer physical block S1'. Similarly, the memory management unit 110b also erases the data temporarily stored in the spare buffer physical block S1' after all the data in the spare buffer physical block S1' is moved to the corresponding physical blocks. Accordingly, data having their sizes smaller than the predetermined value can be repeatedly stored in the buffer physical block S1 and the spare buffer physical block S1'. It should be mentioned that in another exemplary embodiment of the present invention, after an erase command is executed to the physical block which is selected from the spare area 306 and served as a spare buffer physical block, the erased physical block is linked to the spare area 306, and the memory management unit selects another physical block as the spare buffer physical block. Even though in the present exemplary embodiment, the physical block is selected from the spare area to be served as the spare buffer physical block 308, in another exemplary embodiment of the present invention, the spare buffer physical block may also be selected from the special area 308.

Additionally, in the present exemplary embodiment, specific physical blocks (i.e., the special area 308) are allocated as the buffer physical blocks. However, the present invention is not limited thereto, and in another exemplary embodiment of the present invention, the memory management unit 110b selects physical blocks alternatively from the spare area 306 to be served as the buffer physical blocks. For example, after the memory management unit 110b executes the erase command to a physical block currently served as the buffer physical block S1, it links the erased physical block to the spare area 306 and selects another physical block from the spare area 306 as the buffer physical block S1.

It should be mentioned that the grouping of the logical blocks and the allocation of the buffer physical blocks are related to the number of pages in each of the physical blocks. In the example illustrated in FIGS. 3A~3D, if each physical block has 6 pages and the memory management unit 110b can complete the combination of a logical block after two pieces of data are temporarily stored in the spare buffer physical block (i.e., two pages are programmed), the memory management unit 110b can complete the combination of 3 logical blocks when the spare buffer physical block is full. Thus, in the present example, each buffer physical block is corresponding to a logical block group composed of 3 logical blocks, so that it can be ensured that all the data in the corresponding buffer physical block is moved to the corresponding physical blocks before the spare buffer physical block is full. Accordingly, in the present exemplary embodiment, the buffer physical blocks and the spare buffer physical block can be alternatively used for temporarily storing data having their sizes smaller than the predetermined value. It has to be understood that the method for grouping the logical blocks and allocating the buffer physical blocks described above is only an example of the present invention but not intended to limiting the present invention, and any other allocation method can be applied to the present invention as long as data can be temporarily stored in foregoing alternative manner. For example, if each physical block has I pages, the number of logical blocks in each logical block group is set to a number smaller than or equal to I/2, so that all the data stored in the corresponding buffer physical block can be moved before the spare buffer physical block is full.

Even though the present embodiment is described above only regarding the buffer physical block S1 and the spare buffer physical block S1', the operation pattern may also be applied to other buffer physical blocks and spare buffer physical blocks. However, in another exemplary embodiment of the present invention wherein the flash memory storage device 100 has sufficient resources to allow each logical block group to open a set of mother-child blocks, when the memory management unit 110b temporarily stores data into the spare buffer physical block (for example, the spare buffer physical block S1'), the memory management unit 110b only moves the data in one of the logical blocks in the logical block group corresponding to the buffer physical block (for example, the buffer physical block S1).

Figure 4B:
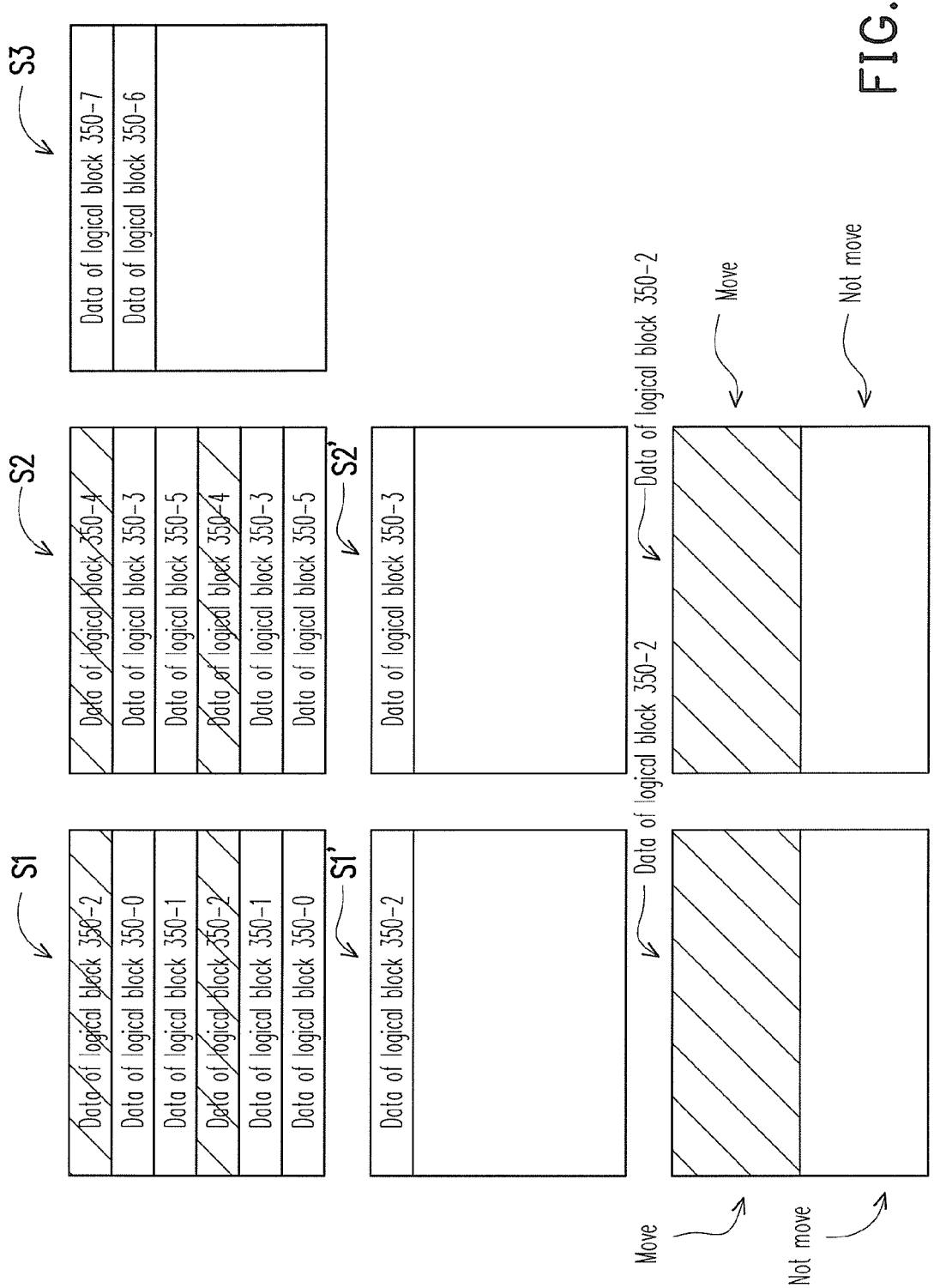

FIGS. 4A~4B illustrate an example of that a flash memory storage system has sufficient resources to allow each logical block group to open a set of mother-child blocks.

Referring to FIG. 4A and FIG. 4B, assuming that the buffer physical block S1 and the buffer physical block S2 are both full, when the memory management unit 110b temporarily stores the data of the logical block 350-2 into the spare buffer physical block S1', the memory management unit 110b combines the data of the logical block 350-2 (as shown in FIG. 4A). After that, when the memory management unit 110b temporarily stores the data of the logical block 350-3 into the spare buffer physical block S2', the memory management unit 110b combines the data of the logical block 350-4 (as shown in FIG. 4B). Herein, data in the logical block 350-2 and the logical block 350-4 is only partially moved (i.e., the mother-child blocks are opened).

It should be mentioned that if the flash memory storage device 100 does not have sufficient resource to allow each logical block group to open a set of mother-child blocks, the memory management unit 110b selects the buffer physical block corresponding to the spare buffer physical block containing relatively more data for moving data. Particularly, in the present example, when the flash memory storage device 100 has already a logical block with partially moved data, the memory management unit 110b continues to move the remaining data of the logical block. Namely, in the present example, when the memory management unit 110b temporarily stores data into different spare buffer physical blocks, the memory management unit 110b still moves data of the same logical block until all the data of the logical block is moved.

Figure 5A:
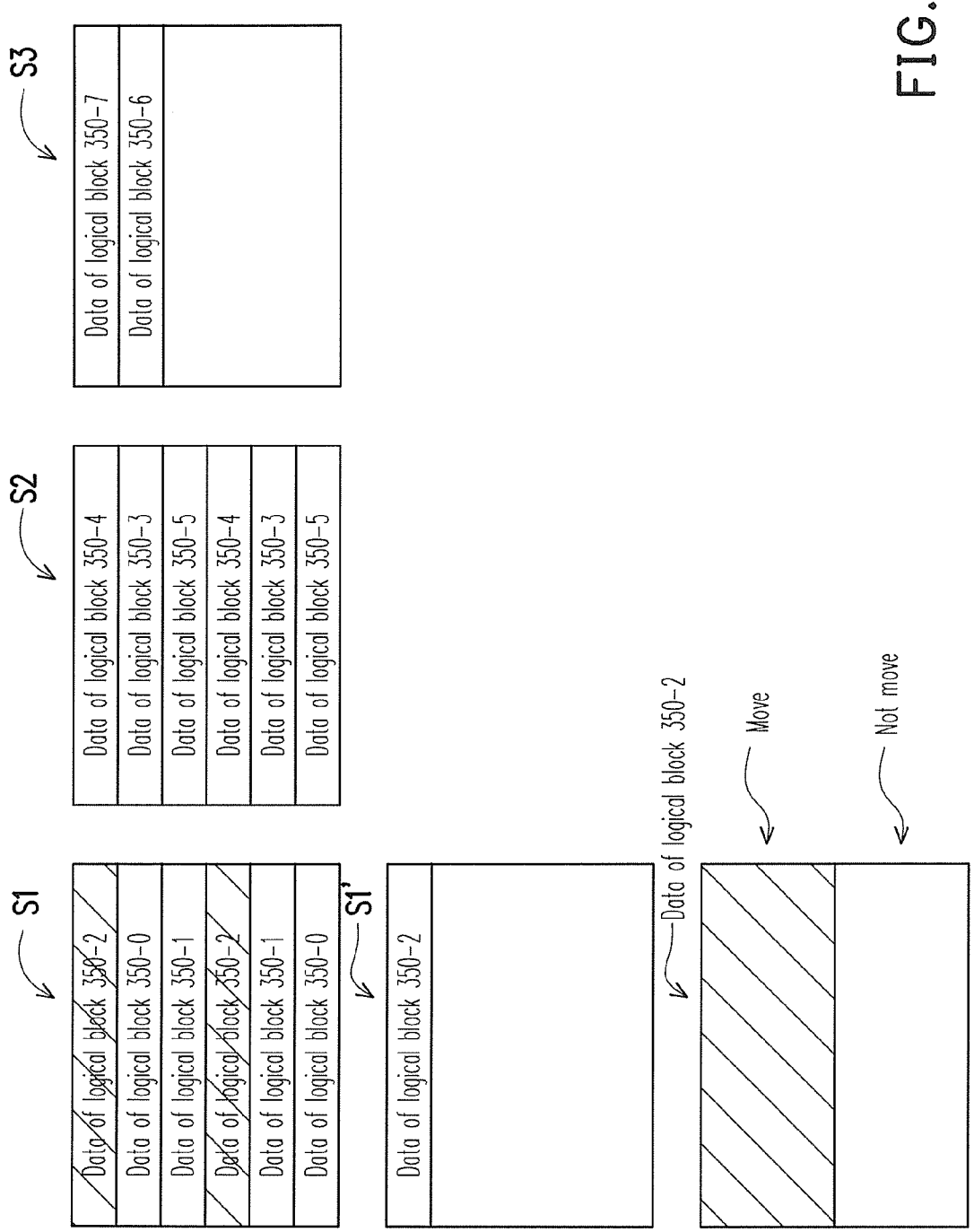
FIGS. 5A~5B illustrate an example of that a flash memory storage system does not have sufficient resource to allow each logical block group to open a set of mother-child blocks.
Figure 5B:
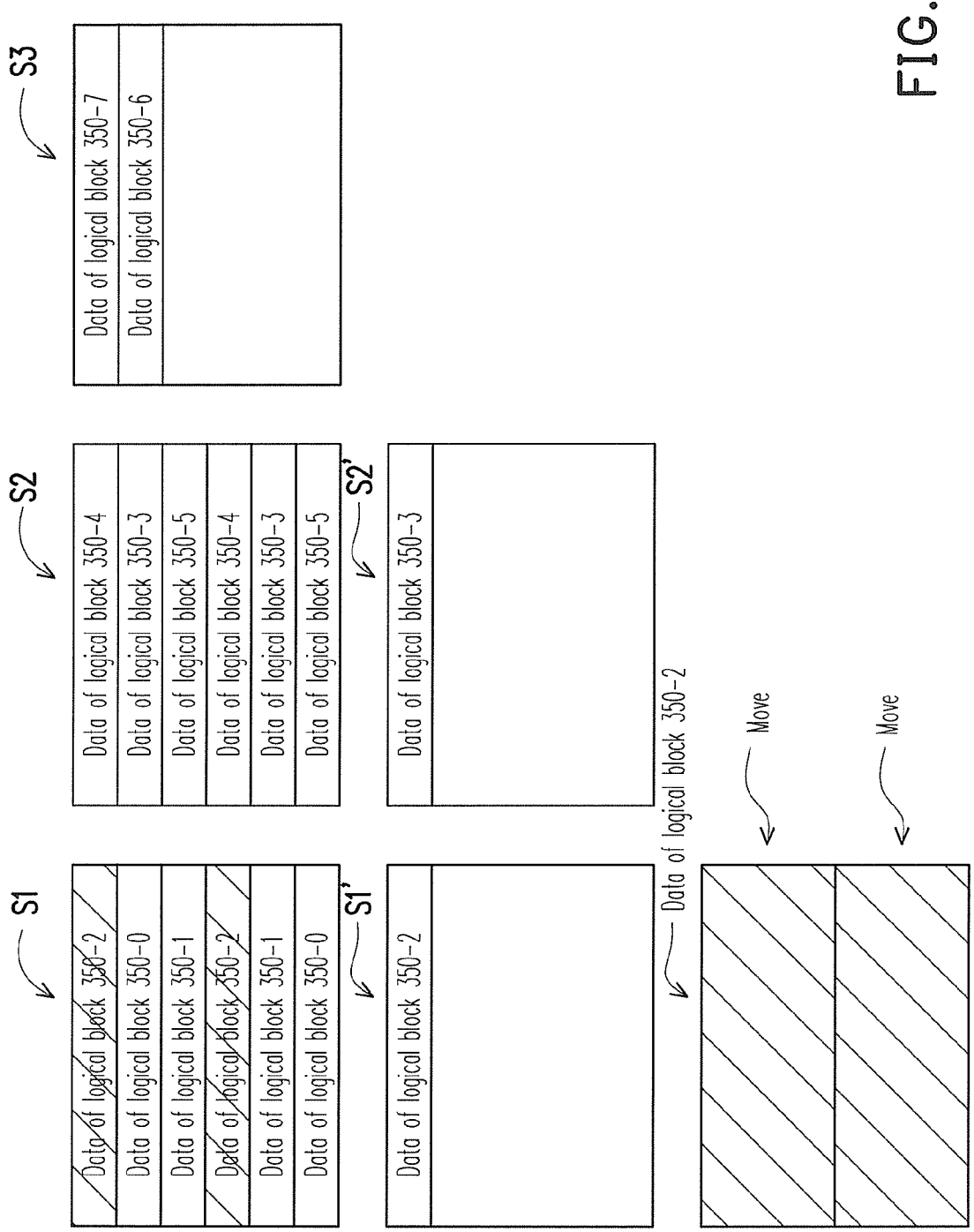

FIGS. 5A~5B illustrate an example of that a flash memory storage system has no sufficient resource to allow each logical block group to open a set of mother-child blocks.

Referring to FIG. 5A and FIG. 5B, assuming both the buffer physical block S1 and the buffer physical block S2 are full, when the memory management unit 110b temporarily stores the data of the logical block 350-2 into the spare buffer physical block S1', the memory management unit 110b combines the data of the logical block 350-2 (as shown in FIG. 5A). After that, when the memory management unit 110b temporarily stores data of the logical block 350-3 into the spare buffer physical block S2', the memory management unit 110b moves the remaining data of the logical block 350-2 to complete the combination of the logical block 350-2 (as shown in FIG. 5B). The memory management unit 110b performs the combination of the logical block corresponding to the buffer physical block S2 when a next write command is executed.

Figure 6:
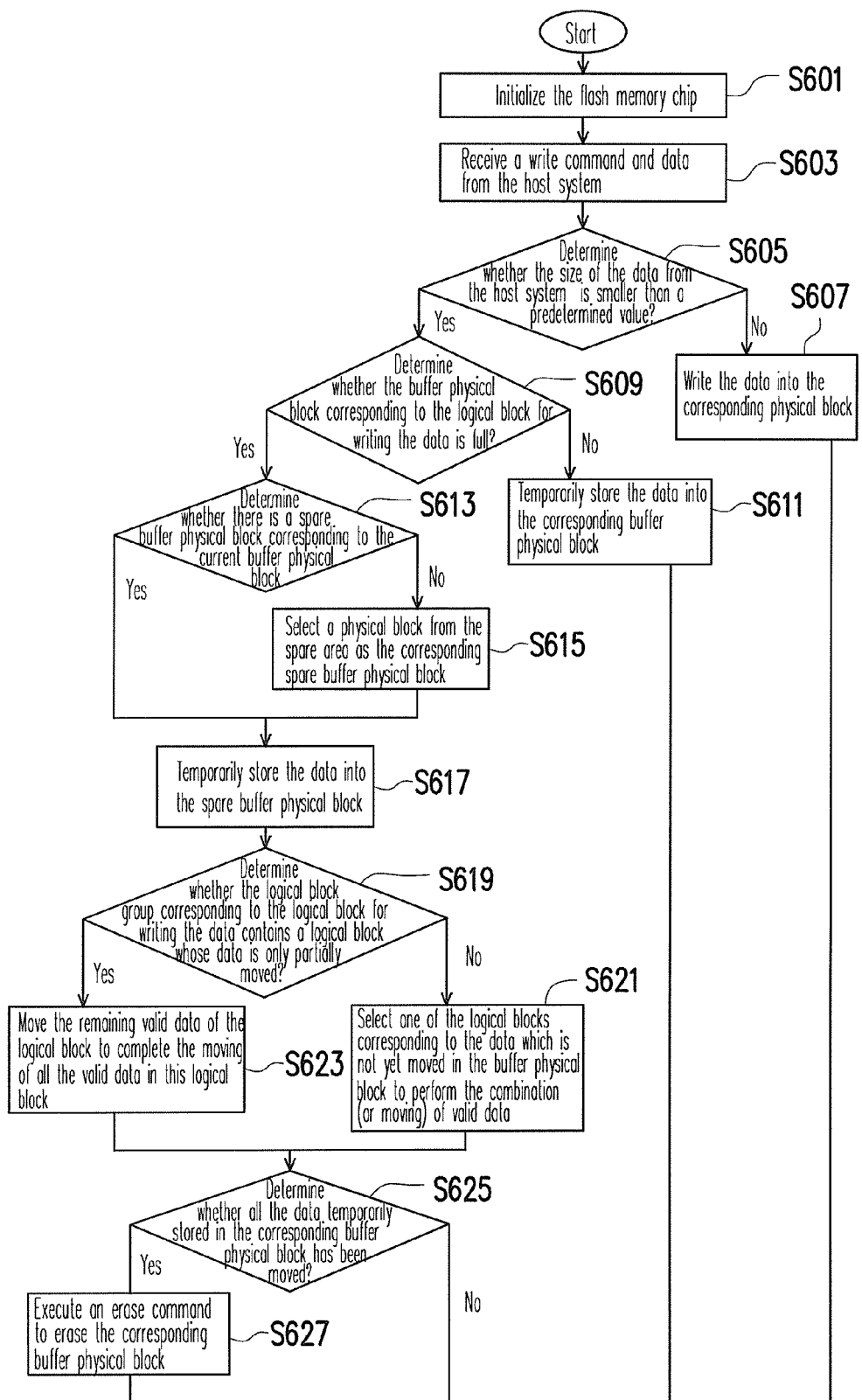
FIG. 6 is a flowchart of a data writing method according to an exemplary embodiment of the present invention.

FIG. 6 is a flowchart of a data writing method according to an exemplary embodiment of the present invention.

Referring to FIG. 6, first, in step S601, the memory management unit 110b initializes the flash memory chip 130. To be specific, in step S601, the memory management unit 110b performs various initializing operations to the flash memory chip 130, such as logically grouping the physical blocks in the flash memory chip 130 into the system area 302, the data area 304, the spare area 306, the special area 308, and the replacement area 330, allocating the logical blocks 350-0~350-H, grouping the logical blocks 350-0~350-H into a plurality of logical block groups, and allocating the buffer physical blocks.

In step S603, the host interface unit 110d receives a write command and data from the host system 200, wherein the microprocessor unit 110a provides information of the write command to the memory management unit 110b.

In step S605, the memory management unit 110b determines whether the size of the data from the host system 200 is smaller than a predetermined value according to the information of the write command.

If the memory management unit 110b determines in step S605 that the size of the data is not smaller than the predetermined value, in step S607, the memory management unit 110b writes the data into the corresponding physical block. The process for writing the data is similar to that illustrated in FIGS. 2B, 2C-1, 2C-2 and 2C-3 therefore will not be described herein.

If the memory management unit 110b determines in step S605 that the size of the data is smaller than the predetermined value, in step S609, the memory management unit 110b determines whether the buffer physical block corresponding to the logical block for writing the data is full. If the buffer physical block corresponding to the logical block for writing the data is not full, in step S611, the memory management unit 110b temporarily stores the data into the corresponding buffer physical block. To be specific, the memory management unit 110b determines the logical block into which the host system 200 is about to store the data and the corresponding logical block group according to the information of the write command, and the memory management unit 110b temporarily stores the data into the buffer physical block corresponding to the logical block for writing the data according to the information provided by the host system 200.

For example, as shown in FIGS. 3A~3D, if the data belongs to the logical blocks 350-0~350-2, the data is temporarily stored into the buffer physical block S1, if the data belongs to the logical blocks 350-3~350-5, the data is temporarily stored into the buffer physical block S2, and if the data belongs to the logical blocks 350-6~350-8, the data is temporarily stored into the buffer physical block S3. For example, as shown in FIG. 3A, if the data to be stored belongs to the logical block 350-2, the data is temporarily stored into the buffer physical block S1.

If the buffer physical block corresponding to the logical block for writing the data is full, in step S613, the memory management unit 110b determines whether there is a spare buffer physical block corresponding to the current buffer physical block. If there is no corresponding spare buffer physical block, in step S615, the memory management unit 110b selects a physical block from the spare area 306 as the corresponding spare buffer physical block. After that, in step S617, the memory management unit 110b temporarily stores the data into the spare buffer physical block. It should be mentioned that in the present exemplary embodiment, when a spare buffer physical block is needed to be allocated, the memory management unit 110b selects a physical block from the spare area 306 as the spare buffer physical block. However, the present invention is not limited thereto, and in another exemplary embodiment of the present invention, a physical block may also be pre-allocated in the special area 308 as the spare buffer physical block.

For example, as shown in FIG. 3B, when the buffer physical block S1 is full, the memory management unit 110b selects a physical block as the spare buffer physical block S1' and temporarily stores the data into the spare buffer physical block S1'.

Next, in step S619, the memory management unit 110b determines whether the logical block group corresponding to the logical block for storing the data contains a logical block whose data is only partially moved. Namely, in step S619, the memory management unit 110b determines whether the logical block group corresponding to the logical block for storing the data contains a logical block which has remaining valid data needed to be moved.

If it is determined in step S619 that the logical block group corresponding to the logical block for storing the data contains no logical block whose data is only partially moved, in step S621, the memory management unit 110b selects one of the logical blocks corresponding to the data which is not yet moved in the buffer physical block to perform the combination (or moving) of valid data, wherein only half of the valid data of the logical block is moved. For example, as shown in FIG. 3B, the memory management unit 110b selects the logical block 350-2 to move the valid data therein.

If it is determined in step S619 that the logical block group corresponding to the logical block for storing the data contains a logical block whose data is only partially moved, in step S623, the memory management unit 110b moves the remaining valid data of the logical block to complete the moving of all the valid data in this logical block (as shown in FIG. 3C).

Next, in step S625, the memory management unit 110b determines whether all the data temporarily stored in the corresponding buffer physical block has been moved. If all the data temporarily stored in the corresponding buffer physical block has been moved, in step S627, the memory management unit 110b executes an erase command to erase the corresponding buffer physical block (as shown in FIG. 3D).

In the present exemplary embodiment of the present invention, data is sequentially selected from the corresponding buffer physical block in order to move the valid data of the corresponding logical block. However, in another embodiment of the present invention, a logical block having the most data temporarily stored in the corresponding buffer physical block may be selected, or a corresponding logical block may be randomly selected, in order to move the valid data therein.

As described above, in the data writing method provided by exemplary embodiments of the present invention, if the size of data is smaller than a predetermined value, the data is temporarily stored in a buffer physical block in a special area, and only part of the valid data in a logical block is moved. Therefore, the previously described exemplary embodiments of the present invention have many advantages, including that a flash memory storage device can complete a data writing action in a short time and respond a host system within a predetermined timeframe and the problem of timeout can be avoided, wherein the advantages aforementioned not required in all versions of the invention. Thereby, through the data writing method provided by the present invention, a large capacity design of each page in a flash memory chip can be applied to a flash memory storage device, so as to increase the storage capacity of the flash memory storage device, without incurring any timeout problem.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data writing method, for writing data from a host system into a flash memory chip, wherein the flash memory chip comprises a plurality of physical blocks, the data writing method comprising:
  receiving, by a flash memory controller, a write command and the data from the host system;
  grouping a part of the physical blocks into a data area, a spare area and a special area;
  allocating a plurality of logical blocks for mapping to the physical blocks of the data area, wherein each of the logical blocks is mapped to at least one of the physical blocks of the data area, the write command indicates to store the data into a first logical block among the logical blocks, and the first logical block maps a first physical block among the physical blocks of the data area;
  grouping the logical blocks into a plurality of logical block groups, wherein at least two of the logical blocks are associated to one of the logical block groups, and the first logical block belongs to a first logical block group among the logical block groups;
  selecting the physical blocks of the special area as a plurality of buffer physical blocks respectively for the logical block groups, wherein the buffer physical blocks only store the data which size is smaller than a predetermined value and a first buffer physical block among the buffer physical blocks is assigned for the first logical block group;
  determining whether a size of the data from the host system is smaller than the predetermined value;
  if the size of the data from the host system is not smaller than the predetermined value, selecting a second physical block from the spare area as a substitute physical block for substituting the first physical block and writing the data into the substitute physical block;
  if the size of the data from the host system is smaller than the predetermined value, determining whether the first buffer physical block is full by using the flash memory controller;
  if the first buffer physical block is not full, writing the data from the host system into the first buffer physical block; and
  if the first buffer physical block is full, selecting a physical block from the spare area as a first spare buffer physical block for the first logical block group and writing the data from the host system into the first spare buffer physical block by using the flash memory controller.

2. The data writing method according to claim 1, wherein after writing the data from the host system into the first spare buffer physical block, the data writing method further comprises copying data belonging to one of the logical blocks from the first buffer physical block to one of the physical blocks of the spare area.

3. The data writing method according to claim 2, wherein the step of copying the data belonging to one of the logical blocks from the first buffer physical block to one of the physical blocks of the spare area comprises:
  selecting one of the data temporarily stored in the first buffer physical block, and determining a logical block corresponding to the selected data;
  selecting one of the physical blocks of the spare area as a substitute physical block for the logical block that is corresponding to the selected data; and
  copying a part of old valid data belonging to the logical block corresponding to the selected data and the selected data in the first buffer physical block to the substitute physical block and leaving a part of old valid data belonging to the logical block corresponding to the selected data in the first buffer physical block during execution of the write command.

4. The data writing method according to claim 2, further comprising erasing all the data temporarily stored in the first buffer physical block when all the data in the first buffer physical block has been copied.

5. The data writing method according to claim 1, wherein the step of grouping the logical blocks into the logical block groups comprises:
  grouping the logical blocks into the logical block groups according to an amount of pages in each of the buffer physical blocks, wherein an amount of the logical blocks in each of the logical block groups is smaller than or equal to a half of the amount of pages in each of the buffer physical blocks.

6. The data writing method according to claim 1, wherein the predetermined value is 3 or 5 sectors.

7. A flash memory control circuit, for writing data from a host system into a flash memory chip, wherein the flash memory chip comprises a plurality of physical blocks, the flash memory control circuit comprising:
  a microprocessor unit;
  a flash memory interface unit, coupled to the microprocessor unit, and used to couple to the flash memory chip;
  a host interface unit, coupled to the microprocessor unit, and used to couple to the host system and receive a write command and the data from the host system;
  a memory management unit, coupled to the microprocessor unit, and used to group a part of the physical blocks into a data area, a spare area and a special area, allocate a plurality of logical blocks for mapping to the physical blocks of the data area, group the logical blocks into a plurality of logical block groups, and select the physical blocks of the special area as a plurality of buffer physical blocks respectively for the logical block groups, wherein the buffer physical blocks only store the data which size is smaller than a predetermined value and,
  wherein the write command indicates to store the data into a first logical block among the logical blocks, the first logical block maps a first physical block among the physical blocks of the data area, at least two of the logical blocks are associated to one of the logical block groups, the first logical block belongs to a first logical block group among the logical block groups and a first buffer physical block among the buffer physical blocks is assigned for the first logical block group,
  wherein the memory management unit further determines whether a size of the data from the host system is smaller than the predetermined value,
  wherein if the size of the data from the host system is not smaller than the predetermined value, the memory management unit selects a second physical block from the spare area as a substitute physical block for substituting the first physical block and writes the data into the substitute physical block,
  wherein if the size of the data from the host system is smaller than the predetermined value, the memory management unit determines whether the first buffer physical block is full, wherein if the first buffer physical block is not full, the memory management unit writes the data from the host system into the first buffer physical block, wherein if the first buffer physical block is full, the memory management unit selects a physical block from the spare area as a first spare buffer physical block for the first logical block group and writes the data from the host system into the first spare buffer physical block.

8. The flash memory control circuit according to claim 7, wherein the memory management unit further copies data belonging to one of the logical blocks from the first buffer physical block to one of the physical blocks of the spare area.

9. The flash memory control circuit according to claim 7, wherein the memory management unit groups the logical blocks into the logical block groups according to an amount of pages in each of the buffer physical blocks, wherein an amount of the logical blocks in each of the logical block groups is smaller than or equal to a half of the amount of pages in each of the buffer physical blocks.

10. The flash memory control circuit according to claim 7, wherein the memory management unit further determines whether there is a logical block whose data is only partially copied, wherein when there is no logical block whose data is only partially copied, the memory management unit copies a part of data temporarily stored in one of the buffer physical blocks to one of the physical blocks, wherein the quantity of data temporarily stored in the spare buffer physical block corresponding to the buffer physical block is greater than the quantity of data temporarily stored in spare buffer physical blocks corresponding to other buffer physical blocks.

11. A flash memory storage system, for storing data from a host system, the flash memory storage system comprising:

a connector, used to couple to the host system and receive a write command and the data from the host system;

a flash memory chip, having a plurality of physical blocks; and a flash memory controller, coupled to the connector and the flash memory chip, and used to group a part of the physical blocks into a data area, a spare area and a special area, allocate a plurality of logical blocks for mapping to the physical blocks of the data area, group the logical blocks into a plurality of logical block groups, and select the physical blocks of the special area as a plurality of buffer physical blocks respectively for the logical block groups, wherein the buffer physical blocks only store the data which size is smaller than a predetermined value, wherein the write command indicates to store the data into a first logical block among the logical blocks, the first logical block maps a first physical block among the physical blocks of the data area, at least two of the logical blocks are associated to one of the logical block groups, the first logical block belongs to a first logical block group among the logical block groups and a first buffer physical block among the buffer physical blocks is assigned for the first logical block group, wherein the flash memory controller further determines whether a size of the data from the host system is smaller than the predetermined value, wherein if the size of the data from the host system is not smaller than the predetermined value, the flash memory controller selects a second physical block from the spare area as a substitute physical block for substituting the first physical block and writes the data into the substitute physical block, wherein if the size of the data from the host system is smaller than the predetermined value, the flash memory controller determines whether the first buffer physical block is full, wherein if the first buffer physical block is not full, the flash memory controller writes the data from the host system into the first buffer physical block, wherein if the first buffer physical block is full, the flash memory controller selects a physical block from the spare area as a first spare buffer physical block for the first logical block group and writes the data from the host system into the first spare buffer physical block.

12. The flash memory storage system according to claim 11, wherein the flash memory controller further copies data belonging to one of the logical blocks from the first buffer physical block to one of the physical blocks of the spare area.

13. The flash memory storage system according to claim 11, wherein the flash memory controller groups the logical blocks into the logical block groups according to an amount of pages in each of the buffer physical blocks, wherein an amount of the logical blocks in each of the logical block groups is smaller than or equal to a half of the amount of pages in each of the buffer physical blocks.

* * * * *